(12) United States Patent
Zeng et al.

(10) Patent No.: US 11,656,672 B2
(45) Date of Patent: May 23, 2023

(54) METHOD FOR CONTROLLING A POWER-DOWN DETECTION CIRCUIT, CONTROLLER AND COMPUTER READABLE STORAGE MEDIA

(71) Applicant: Contemporary Amperex Technology Co., Limited, Ningde (CN)

(72) Inventors: Yuqun Zeng, Ningde (CN); Kai Wu, Ningde (CN); Le Chu, Ningde (CN); Jianwei Zhuo, Ningde (CN); Qiandeng Li, Ningde (CN)

(73) Assignee: Contemporary Amperex Technology Co., Limited, Ningde (CN)

( * ) Notice: Subject to any disclaimer, the term of this patent is extended or adjusted under 35 U.S.C. 154(b) by 195 days.

(21) Appl. No.: 17/315,260

(22) Filed: May 7, 2021

(65) Prior Publication Data

US 2021/0263580 A1    Aug. 26, 2021

Related U.S. Application Data

(63) Continuation of application No. 16/357,552, filed on Mar. 19, 2019, now Pat. No. 11,048,316.

(30) Foreign Application Priority Data

Sep. 17, 2018    (CN) .......................... 201811083339.7

(51) Int. Cl.
*G06F 1/26*      (2006.01)
*G06F 1/30*      (2006.01)
(Continued)

(52) U.S. Cl.
CPC ............ *G06F 1/3225* (2013.01); *G06F 1/263* (2013.01); *G06F 1/30* (2013.01); *G06F 1/3275* (2013.01)

(58) Field of Classification Search
CPC ..................................... B60L 3/04; G06F 1/30
See application file for complete search history.

(56) References Cited

U.S. PATENT DOCUMENTS

| 2002/0179346 A1 | 12/2002 | Dollar, II |
| 2007/0085872 A1 | 4/2007 | Teradaira |

(Continued)

FOREIGN PATENT DOCUMENTS

| CN | 102437598 A | 5/2012 |
| CN | 202260534 U | 5/2012 |

(Continued)

OTHER PUBLICATIONS

The First Office Action for Chinese Application No. 202110012649.5, dated Jun. 21, 2022, 15 pages.

(Continued)

*Primary Examiner* — Mark A Connolly
(74) *Attorney, Agent, or Firm* — East IP P.C.

(57) ABSTRACT

The present application provides a method for controlling a power-down detection circuit, a controller and a computer readable storage medium. The method includes: receiving, by a controller of a power-down detection circuit, a power-down signal, wherein the power-down signal is sent from a power-down detection sub-circuit of the power-down detection circuit when it is determined by the power-down detection sub-circuit that an output voltage of a low-voltage side power supply of the power-down detection circuit is smaller than a threshold, and wherein the power-down detection sub-circuit and the controller are powered by the low-voltage side power supply; controlling, by the controller, a memory of the power-down detection circuit to record fault information, wherein the fault information comprises current information of a high voltage bus sensed by a high-voltage side current sensor of the power-down detec- (Continued)

tion circuit; and performing, by the controller, a fault diagnosis based on the fault information.

13 Claims, 5 Drawing Sheets

(51) Int. Cl.
*G06F 1/32* (2019.01)
*G06F 1/3225* (2019.01)
*G06F 1/3234* (2019.01)

(56) References Cited

U.S. PATENT DOCUMENTS

| | | | |
|---|---|---|---|
| 2017/0093316 A1 | 3/2017 | Toyora | |
| 2017/0192060 A1 | 7/2017 | Pizzuti | |
| 2017/0336476 A1* | 11/2017 | Wand | G01R 17/02 |
| 2018/0147942 A1 | 5/2018 | Iida et al. | |

FOREIGN PATENT DOCUMENTS

| | | | | |
|---|---|---|---|---|
| CN | 202260564 U | 5/2012 | | |
| CN | 103381756 A | 11/2013 | | |
| CN | 103744747 A | 4/2014 | | |
| CN | 104827921 A | 8/2015 | | |
| CN | 105620292 A | 6/2016 | | |
| CN | 106300229 A | 1/2017 | | |
| CN | 206023171 U | 3/2017 | | |
| CN | 206331107 U | 7/2017 | | |
| CN | 107284247 A * | 10/2017 | | |
| CN | 107885631 A | 4/2018 | | |
| CN | 207481815 U | 6/2018 | | |
| DE | 102012204029 A1 * | 9/2013 | .......... | B60L 11/1861 |
| EP | 2355229 A1 * | 8/2011 | .......... | B60L 11/1851 |
| JP | 2008301612 A | 12/2008 | | |

OTHER PUBLICATIONS

The extended European search report dated Aug. 29, 2019 for European Application No. 19161110.2, 8 pages.
The First Office Action and search report dated Sep. 9, 2020 for Chinese Application No. 201811083339.7, 11 pages.
The First Office Action for U.S. Appl. No. 16/357,552, dated Nov. 20, 2020, 13 pages.
The Final Office Action for U.S. Appl. No. 16/357,552, dated Feb. 1, 2021, 11 pages.

* cited by examiner

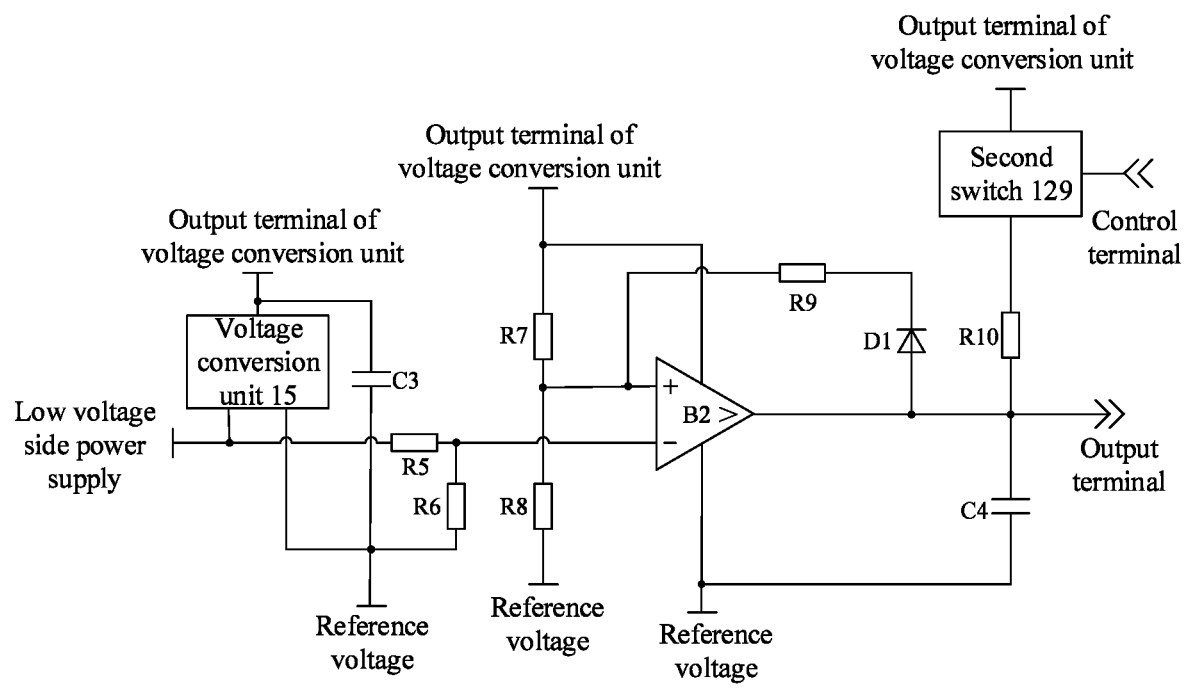

Fig. 5 acquiring, by a power-down detection sub-circuit, an output voltage of the low-voltage side power supply, and determining whether a power-down event occurs in the low-voltage side power supply according to the output voltage of the low-voltage side power supply — S301 sending, by the power-down detection sub-circuit, a power-down signal to the controller in the case that it is determined that a power-down event occurs in a low-voltage side power supply — S302 receiving, by the controller, the power down signal, and controlling the memory to record fault information including current information of a high voltage bus sensed by a high voltage side current sensor — S303

Fig.6

METHOD FOR CONTROLLING A POWER-DOWN DETECTION CIRCUIT, CONTROLLER AND COMPUTER READABLE STORAGE MEDIA

CROSS-REFERENCE TO RELATED APPLICATION

The present application is a continuation of U.S. patent application Ser. No. 16/357,552, filed on Mar. 19, 2019, which claims priority to Chinese Patent Application No. 201811083339.7, filed on Sep. 17, 2018. The afore-mentioned patent applications are incorporated herein by reference in their entireties.

TECHNICAL FIELD

The present disclosure relates to the field of power related technologies, and in particular, to a method for controlling a power-down detection circuit, a controller and a computer readable storage medium.

BACKGROUND

With rapid development of electrical power resources, they can provide power for more and more devices, such as electrical vehicles, electrical ships, electrical aircrafts, etc. The safety of such devices powered by electrical power resources has become an important concern.

In a device powered by an electrical power resource, a low-voltage side power supply supplies power to a battery management system. If the low-voltage side power supply is accidentally powered down, the battery management system will also be powered off unexpectedly. During operation of a device powered by an electrical power resource, vibration of the device or aging of wiring harness contactors in the device may cause the low-voltage side power supply in the device to be accidentally disconnected, resulting in power-off of the battery management system. Unexpected power-off of the battery management system adversely affect the device, for example, it may cause unintended connection or disconnection of a contactor, resulting in damage to the contactor, or it may cause the device to lose power suddenly, reducing the safety of the device.

SUMMARY

Embodiments of the present disclosure provide a power-down detection circuit and a control method, which can improve safety of a device powered by an electrical power resource.

In a first aspect, there is provided a power-down detection circuit according to embodiments of the present disclosure. The power-down detection circuit includes: a low-voltage side power supply, a voltage conversion unit, a power-down detection sub-circuit, a controller, a memory and a high-voltage side current sensor. The low-voltage side power source is connected to the power-down detection sub-circuit and the voltage conversion unit, configured to provide an output voltage of the low-voltage side power supply to the power-down detection sub-circuit and supply power for the power-down detection circuit, the controller and the memory via the voltage conversion unit. The voltage conversion unit is connected to the power-down detection sub-circuit, the controller and the memory, configured to convert a voltage of the low-voltage side power source into a standard power supply voltage to supply power for the power-down detection sub-circuit, the controller and the memory. The power-down detection sub-circuit is connected to the controller, configured to acquire the output voltage of the low-voltage side power source, determine, according to the output voltage of the low-voltage side power source, whether a power-down event occurs in the low-voltage side power source, and send, in the case it is determined that a power-down event occurs, a power-down signal to the controller. The controller is connected to the memory, a high-voltage side current sensor and the voltage conversion unit, configured to receive the power-down signal and control the memory to record fault information, the fault information including current information sensed by the high-voltage side current sensor. The high-voltage side current sensor is configured to sense the current information on a high-voltage bus.

In a second aspect, there is provided a control method applied in a power-down detection circuit according to the above technical solution according to embodiments of the present disclosure. The control method includes: acquiring, by a power-down detection sub-circuit, an output voltage of the low-voltage side power supply, and determining whether a power-down event occurs in the low-voltage side power supply according to the output voltage of the low-voltage side power supply; sending, by the power-down detection sub-circuit, a power-down signal to the controller in the case that it is determined that a power-down event occurs in a low-voltage side power; receiving, by the controller, the power down signal, and controlling the memory to record fault information, the fault information including current information of a high voltage bus sensed by the high voltage side current sensor.

With the power-down detection circuit and control method according to embodiments of the present disclosure where the power-down detection sub-circuit in the power-down detection circuit determine whether a low-voltage side power supply has a power-down event by detecting the voltage of the low-voltage side power supply, and in the case that it is determined that the low-voltage side power supply has a power-down event, a power-down signal is sent to the controller such that the controller, after receipt of the power down signal, controls the memory to records fault information, it is possible to timely discover power-down of the low-voltage side power supply and record fault information, which facilitates subsequent fault analysis and prevention and improves safety of a device powered by an electrical power resource.

BRIEF DESCRIPTION OF THE DRAWINGS

The present disclosure may be better understood from the following description of embodiments of the invention. The same or similar reference numerals indicate the same or similar features.

FIG. 5 is a schematic structural diagram of a power-down detection sub-circuit in another specific example of embodiments of the present disclosure;

FIG. 6 is a flowchart of a control method applied in a power-down detection circuit according to an embodiment of the present disclosure;

DETAILED DESCRIPTION

Figure 1:
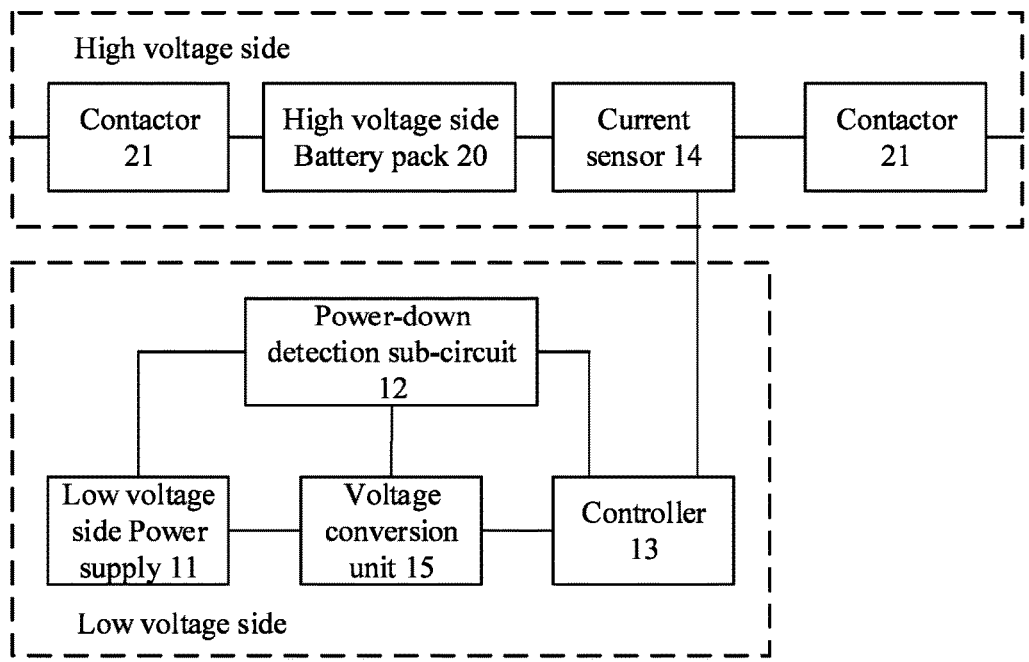
FIG. 1 is a schematic structural diagram of a power-down detection circuit according to embodiments of the present disclosure.

Features and exemplary embodiments of various aspects of the present invention are described in detail below. In the following detailed description, numerous specific details are set forth in order to provide complete understanding of the present invention.

It will be apparent to those skilled in the art, however, that the present invention may be practiced without some of these details. The following description of embodiments is merely provided to provide a better understanding of the present invention. The present invention is in no way limited to any specific configuration and algorithm set forth below, but covers any modification, alternation and improvement of various elements, components and algorithms without departing from the spirit and scope of the present invention. In the drawings and the following description, well-known structures and techniques are not shown in order to avoid unnecessary obscuring the present invention.

There is provided a power-down detection circuit and a control method according to embodiments of the present disclosure, which can be applied to a device powered by electrical power resource to detect power-down of a low voltage side power supply. When there occurs power-down of the low-voltage side power supply, it is possible to record various parameter information during power-down of the low-voltage side power supply, so as to facilitate subsequent fault analysis. The power-down of the low-voltage side power supply may be caused by disconnection of the low-voltage side power supply and instability of the low-voltage side power supply voltage, which is not limited herein. A device powered by an electrical power resource may include electrical vehicles, electrical ships, electrical aircrafts, etc., and is not limited herein.

FIG. 1 is a schematic structural diagram of a power-down detection circuit according to embodiments of the present disclosure. As shown in FIG. 1, the power-down detection circuit includes a low-voltage side power supply 11, a power-down detection sub-circuit 12, a controller 13, a memory, a high-voltage side current sensor 14, and a voltage conversion unit 15. The high-voltage side current sensor 14 is located at the high-voltage side and can be disposed in a circuit having a high-voltage side battery pack 20 and contactors 21. The high-voltage side battery pack 20, the contactors 21 and the high-voltage side current sensor 14 are connected via a high-voltage bus, and the high-voltage side current sensor 14 is configured to sense current information of the high-voltage bus. The memory in the power-down detection circuit may be integrated with the controller 13 or may be provided separately from the controller 13. In the power-down detection circuit shown in FIG. 1, the memory is integrated in the controller 13, so the memory is not shown separately in FIG. 1.

The low-voltage side power supply 11 is connected to the power-down detection sub-circuit 12 and the controller 13 for supplying output voltage of the low-voltage side power supply to the power-down detection sub-circuit 12, and for supplying power for the power-down detection sub-circuit 12, the controller and the memory through the voltage conversion unit 15.

The low-voltage side power source 11 may be an independent power source disposed at the low-voltage side, specifically a lead-acid battery, and may be other types of batteries. The low-voltage side power supply 11 may also be implemented by using the high-voltage side battery pack 20 and stepping down through a power supply circuit so as to supply power to the power-down detection sub-circuit 12 and the controller 13. That is to say, output terminal of the high-voltage side battery pack 20 stepped down by the power supply circuit may be regarded as an output terminal of the low-voltage side power supply 11.

In some examples, the voltage conversion unit 15 may be provided. The voltage conversion unit 15 is connected to the low-voltage side power supply 11, the power-down detection sub-circuit 12, and the controller 13. The voltage conversion unit 15 is configured to convert the voltage of the low-voltage side power supply 11 into a standard supply voltage, and supplies power to the power-down detection sub-circuit 12, the controller 13, and the memory. It should be noted that the standard supply voltage is a voltage suitable for the power-down detection sub-circuit 12, the controller 13, and the memory to operate normally. It should be noted that, within normal operation voltage range of the voltage conversion unit 15, the output from the output terminal of the voltage conversion unit 15 keeps steady even if voltage of the input terminal of the voltage conversion unit 15 (i.e., the output voltage of the low-voltage power source 11) changes. For example, assuming the normal operation voltage range of the voltage conversion unit 15 is 3 to 40 V, even if the output voltage of the low-voltage side power supply 11 drops to 5 V, the output of the output terminal of the voltage conversion unit 15 is still stable enough to ensure normal operation of the power-down detection sub-circuit 12. If the output voltage of the low-voltage side power supply 11 drops to 2V, the power-down detection sub-circuit 12 and the controller 13 may be powered by a first capacitor C1.

The power-down detection sub-circuit 12 is connected to the controller 13. The power-down detection sub-circuit 12 is configured to obtain the output voltage of the low-voltage side power source 11, and determine whether or not the low-voltage side power source 11 has a power-down event based on the output voltage of the low-voltage side power source 11. The power-down detection sub-circuit 12 is further configured to transmit a power-down signal to the controller 13 if it is determined that the low-voltage side power source 11 has a power down event.

When the low-voltage side power source 11 is powered down, the output voltage of the low-voltage side power source 11 is lowered. Specifically, it is determined whether or not the low-voltage side power source 11 has a power-down event based on the obtained output voltage of the low-voltage side power source 11. For example, if the output voltage of the low-voltage side power source 11 is lower than a certain threshold, it is determined that the low-voltage side power source 11 has a power-down event. In the case that it is determined that the low-voltage side power source 11 has a power-down event, the power-down detection sub-circuit 12 issues a power-down signal to the controller 13 to notify the controller 13 that the low-voltage side power source 11 is powered down.

The controller 13 is connected to the memory and the high-voltage side current sensor 14, configured to receive the power-down signal and control the memory to record fault information, the fault information including current information sensed by the high-voltage side current sensor. Specifically, the controller 13, upon receives the power-down signal, determines that the low-voltage side power source 11 is powered down. The controller 13 transmit current information of the high-voltage bus transmitted by the high-voltage side current sensor 14 to the memory, and control the memory to store the current information.

The high-voltage side current sensor 14 is located in a high-voltage side circuit having the high voltage bus. The high-voltage side battery pack 20 and the contactor 21 are also connected by the high voltage bus. The contactor 21 may include a positive contactor 21 connected to a positive electrode of the high-voltage side battery pack 20 and a negative contactor 21 connected to a negative electrode of the high voltage side battery pack 20. In FIG. 1, not a complete high-voltage side circuit is shown, but only the high-voltage side battery pack 20, the contactors 21, and the high-voltage side current sensor 14 related to the embodiments of the present disclosure are shown. The contactor 21 may also be connected to a load. The high-voltage side current sensor 14 is configured to sense current information of the high voltage bus.

The controller 13 receives the power-down signal, and upon determination that the low-voltage side power source 11 is powered down, controls the memory to record fault information. In some examples, controller 13 may send a control instruction to the memory to control the memory to record fault information. In other examples where the memory is integrated in the controller 13, the memory can share the received signals and instructions with the controller 13, and thus the memory can actively record the fault information when the controller 13 receives the power-down signal.

The fault information include current information of the high voltage bus sensed by the high-voltage side current sensor 14. In some examples, the fault information may further include parameter information such as voltage information of the low-voltage side power source 11, voltage information of battery cells in the high-voltage side battery pack 20, and overall information of the device powered by an electrical power resource, and the like, and thus is not limited therein. Correspondingly, the controller 13 may also perform fault diagnosis of the high-voltage side battery pack 20, the low-voltage side power source 11, and the whole device powered by an electrical power resource based on the fault information. For example, in the case that the device powered by an electrical power resource is an electrical vehicle, overall information of the device may be vehicle information of the entire electrical vehicle, and the controller 13 may also perform fault diagnosis of the electrical vehicle.

It should be noted that, the controller 13, after reception of the power-down signal and when the low-voltage side power source 11 is powered on again, may issue a prompt message to prompt the user that a power-down fault has occurred in the low-voltage side power source 11 previously. The specific form of the prompt information is not limited herein.

In embodiments of the present disclosure, the power-down detection sub-circuit 12 in the power-down detection circuit can determine whether the low-voltage side power source 11 has a power-down event by detecting the output voltage of the low-voltage side power source 11. If it is determined that the low-voltage side power supply has a power-down event, sends a power-down signal to the controller 13. The controller 13 receives the power down signal, and controls the memory to record fault information. Therefore, it is possible to timely discover the situation that the low-voltage side power source 11 is powered down, and record the fault information, so as to facilitate subsequent fault analysis and prevention, and improve safety of the device powered by an electrical power resource.

In some examples, controller 13 may be further configured to utilize current information of the high voltage bus, historical current information and historical power-down times stored in the memory to estimate current life of contactor 21.

Every time the controller 13 receives a power-down signal, it controls the memory to record current information of the high voltage bus at that time. Therefore, the memory stores current information of the high voltage bus every time the controller 13 receives a power-down signal. The memory may also store current information (i.e. historical current information) other than current information of the high voltage bus currently recorded when the controller 13 receives a power-down signal. The memory may also record the number of times the memory is controlled by the controller 13 to record current information. For a power-down event of the low-voltage side power supply 10, the memory performs a record of current information. Therefore, the number of times current information is recorded in the memory may be taken as the number of historical power-down events.

In the case that the low-voltage side power source 11 is powered down, if the high-voltage side battery pack 20 is outputting a large current, the contactor 21 is cut off with a load. If load current is large, an arc is generated at a contact point at the moment when the contact point of the contactor 21 is disconnected, and a large amount of heat is released in a short time. If life of the contactor 21 is already close to its limit, a portion of the contact point of the contactor 21 may be rapidly heated to be subjected to fusion welding, causing the contact point of the contactor 21 to stick and in turn the contactor 21 to be unintended to be connected. This may damages the contactor 21 and may also endanger personal safety of the user.

The life of the contactor 21 is related to magnitude of current when the connector 21 is cut off with a load (i.e., the current information of the high voltage bus) and the number of times the connector has been cut off (i.e., the number of historical power-downs). The current when the connector 21 is cut off with a load can be obtained by current information of the high voltage bus when the low-voltage side power source 11 is powered down. For example, correspondence between current information of the high voltage bus when the low-voltage side power source 11 is powered down and life of the contactor 21 may be obtained from a parameter table provided by supplier or manufacturer of the contactor 21. Therefore, current life of the contactor 21 may be estimated according to current information of the high voltage bus recorded every the low-voltage side power source 11 is powered down, historical current information, historical power-down times, and the parameter table.

For example, Table 1 shows correspondence between current while a certain type of contactor 21 being cut off with a load and life of the contactor 21. From the Table 1, it is possible to estimate current life of the contactor 21 from the current while the contactor 21 being cut off with a load.

TABLE 1

| Load Current (Unit: amp) | Life of Contactor (Unit: times) |
| --- | --- |
| 2500 | 3 |
| 600 | 300 |
| 300 | 1000 |

It should be noted that, when current life of the contactor 21 has not reached its life limit, but has approached the life limit, the controller 13 may issue a prompt message to prompt the user that the contactor 21 is highly likely to cause a danger and thus it requires to take certain measures on the contactor 21. Specifically, an alarm threshold may be set, which has not reach the limit. If current life of the contactor 21 reaches the alarm threshold, the controller 13 issues a prompt message.

In some examples, the power-down detection sub-circuit may be further configured to lock output signal of the power-down detection sub-circuit if it is determined that the low-voltage side power supply has a power-down event. It should be noted that locking the output signal of the power-down detection sub-circuit indicates the output signal of the power-down detection sub-circuit is kept as the power-down single. There may be a case where a low-power side power supply has multiple power-down events in a short period of time due to poor contact, and in such case the memory needs to be erased multiple times, which shortens life of the memory. By locking the output signal of the power-down detection sub-circuit upon determination that the low-voltage side power supply has a power-down event, it prevents the memory from being erased multiple times in a short time, thereby prolonging the life of the memory.

The power-down detection sub-circuit 12 in the power-down detection circuit will be described below in two specific embodiments.

Figure 2:
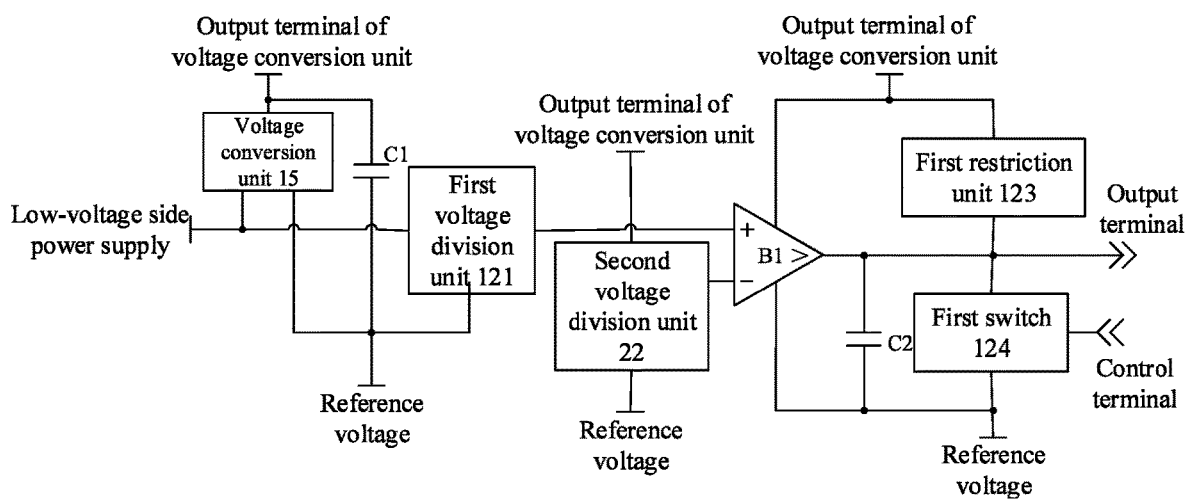
FIG. 2 is a schematic structural diagram of a specific implementation of a power-down detection sub-circuit according to embodiments of the present disclosure.

FIG. 2 is a schematic structural diagram of a specific implementation of a power-down detection sub-circuit according to an embodiment of the present disclosure. As shown in FIG. 2, the power-down detection sub-circuit 12 include a first voltage division unit 121, a second voltage division unit 122, a first current restriction unit 123, a first comparator B1, a first capacitor C1, a second capacitor C2 and a first switch 124.

A first terminal of the first capacitor C1 is connected to the output terminal of the voltage conversion unit. The other terminal of the first capacitor C1 is connected to a reference voltage. The number of the first capacitors C1 is not limited herein. The first capacitor C1 is configured to supply power to the power-down detection sub-circuit 12, the controller 13, the memory, and the like after the low-voltage side power source 11 is powered down, to maintain operation of the power-down detection sub-circuit 12, the controller 13, and the memory, ensure implementation of detection of power-down of the low-voltage side power supply 11 and recording of fault information by the memory.

Specifically, for example, if the output voltage of the low-voltage side power supply 11 after it is powered down is within a normal operating voltage range of the voltage conversion unit 15, the output voltage of the voltage conversion unit 15 is maintained to be stable, so it does not require the first capacitor C1 to provide power supply. If the output voltage of the low-voltage side power supply 11 after it is powered down falls out of the normal operating voltage range of the voltage conversion unit 15, the voltage conversion unit 15 cannot maintain a stable output. In this case, it requires the first capacitor C1 to provide power supply for the power-down detection sub-circuit 12, the controller 13 and the memory for a period of time.

It should be noted that capacitance of the first capacitor C1 may be selected according to power consumption of the power-down detection sub-circuit 12, the controller 13 and the memory, and the length of time required for the memory to record the fault information. The capacitance of the first capacitor C1 needs to at least satisfy consumption by the power-down detection sub-circuit 12, the controller 13 and the memory for a time period required to complete record of the fault information.

The voltage outputted by the voltage conversion unit 15 is a standard supply voltage obtained by converting the voltage of the low-voltage side power source 11 via the voltage conversion unit 15.

An input terminal of the first voltage division unit 121 is connected to the low-voltage side power source 11, the first output terminal of the first voltage division unit 121 is connected to a non-inverting input terminal of the first comparator B1, and a second output terminal of the first voltage division unit 121 is connected to a reference voltage.

The first voltage division unit 121 is configured to provide an input voltage to the non-inverting input terminal of the first comparator B1. The first voltage division unit 121 may include a resistor or other element having a certain impedance. There is no limitation on connection manner and the number of elements in the first voltage division unit 121.

An input terminal of the second voltage division unit 122 is connected to the output terminal of the voltage converting unit, a first output terminal of the second voltage division unit 122 is connected to an inverting input terminal of the first comparator B1, and a second voltage division unit 122 is connected to a reference voltage.

The second voltage division unit 122 is configured to provide an input voltage to the inverting input terminal of the first comparator B1. The second voltage division unit 122 may include a resistor or other element having a certain impedance, and there is no limitation on connection manner and the number of elements in the second voltage division unit 122.

An output terminal of the first comparator B1 is connected to an output terminal of the first current restriction unit 123, a first terminal of the first switch 124, one terminal of the second capacitor C2, and the output terminal of the power-down detection sub-circuit 12. A first power supply terminal of the first comparator B1 is connected to the output terminal of the voltage conversion unit and the input terminal of the first current restriction unit 123. A second power supply terminal of the first comparator B1 is connected to the other terminal of the second capacitor C2, a second terminal of the first switch 124, and a reference voltage.

A control terminal of the first switch 124 is connected to the output terminal of the controller 13.

The first current restriction unit 123 may include a resistor or other element having a certain impedance, and there is no limitation on connection manner and the number of elements in the first current restriction unit 123.

The second capacitor C2 is configured to filter an output signal from the output terminal of the first comparator B1.

The first switch 124 may include one or more of a switch, a triode, a Metal-Oxide-Semiconductor Field-Effect Transistor (MOSFET), and the like, which is not limited herein.

The reference voltages discussed above is a reference low potential, and may be a negative electrode of the low voltage power supply or ground, which is not limited herein.

Figure 3:
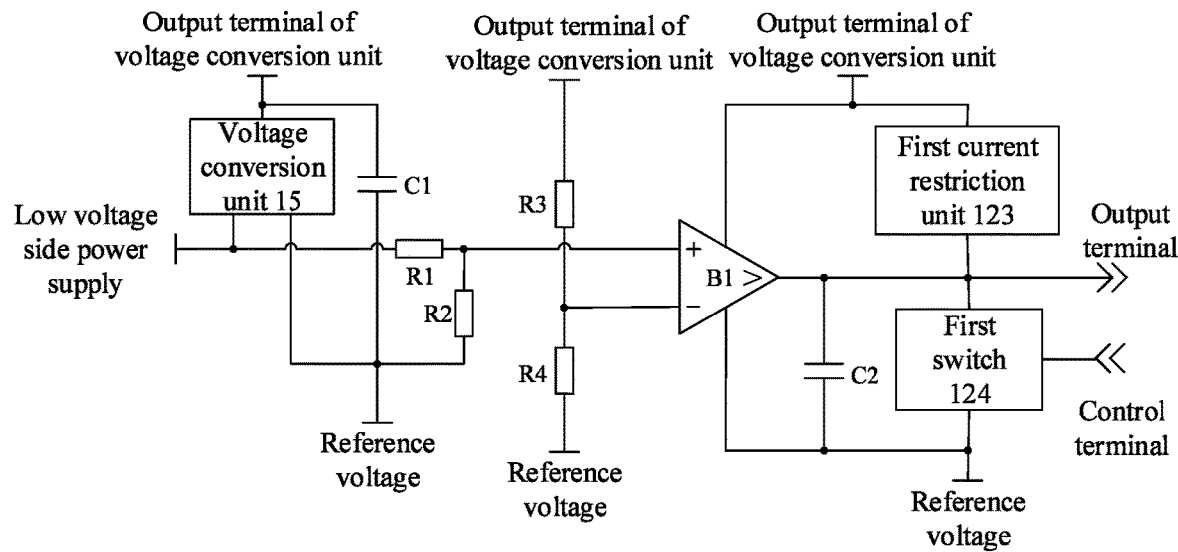
FIG. 3 is a schematic structural diagram of a power-down detection sub-circuit in a specific example of embodiments of the present disclosure.

The operation of the power-down detection sub-circuit 12 shown in FIG. 2 in the power-down detection circuit will be described below. For convenience of explanation, an example will be described here. FIG. 3 is a schematic structural diagram of a power-down detection sub-circuit according to a specific example of embodiments of the present disclosure. As shown in FIG. 3, it is assumed that the first voltage division unit 121 includes two resistors, a first resistor R1 and a second resistor R2, respectively. One terminal of the first resistor R1 is connected to the low-voltage side power source 11, the other terminal of the first resistor R1 is connected to one terminal of the second resistor R2, and the other terminal of the second resistor R2 is connected to a reference voltage. The other terminal of the first resistor R1 and one terminal of the second resistor R2 are both connected to a non-inverting input terminal of the first comparator B1. The second voltage division unit 122 includes two resistors, a third resistor R3 and a fourth resistor R4. One terminal of the third resistor R3 is connected to the first voltage V1, the other terminal of the third resistor R3 is connected to one terminal of the fourth resistor R4, and the other terminal of the fourth resistor R4 is connected to a reference voltage. The other terminal of the third resistor R3 and one terminal of the fourth resistor R4 are both connected to an inverting input terminal of the first comparator B1. Let resistances of the first resistor R1, the second resistor R2, the third resistor R3, and the fourth resistor R4 be $R_1$, $R_2$, $R_3$, and $R_4$, respectively, and $R_2/R_1=R_4/R_3$. The output voltage of the low-voltage side power source 11 is $V_{battery}$. The standard supply voltage is $V_{DD}$.

Then, the input voltage $V_p$ of the non-inverting input terminal of the first comparator B1 is as shown in the formula (1), and the input voltage $V_n$ of the inverting input terminal of the first comparator B1 is as shown in the formula (2):

$$V_p = V_{battery} \times R_2/(R_1+R_2) \quad (1)$$

$$V_n = V_{DD} \times R_4/(R_3+R_4) \quad (2)$$

The first switch 124 has an initialization state being OFF. It should be noted that the initialization state herein refers to an initial state at which detection is started. When the detection is started, the first switch 124 is turned off. Specifically, the first switch 124 being turned off indicates that the first terminal of the first switch 124 and the second terminal of the first switch 124 are disconnected.

When the low-voltage side power source 11 does not have a power-down event, the output voltage $V_{battery}$ of the low-voltage side power source 11 is higher than the standard supply voltage $V_{DD}$, so $V_p > V_n$. The output signal from the output terminal of the first comparator B1 is a high level signal.

When the low-voltage side power supply 11 has a power-down event, the output voltage $V_{battery}$ of the low-voltage side power supply 11 is lower than the standard supply voltage $V_{DD}$. Therefore, $V_p < V_n$. The output signal from the output terminal of the first comparator B1 is a low level signal. The output terminal of the first comparator B1 is connected to the output terminal of the power-down detection sub-circuit 12, so the power-down detection sub-circuit 12 also outputs a low-level signal, which may be used as a power-down signal.

When the controller 13 detects the power-down signal output from the output terminal of the power-down detection sub-circuit 12, it can control the memory to record fault information.

The input terminal of the controller 13 is connected to the output terminal of the power-down detection sub-circuit 12, and the output terminal of the controller 13 is connected to the control terminal of the first switch 124. The controller 13 is further configured to issues, according to a power-down signal outputted by the output terminal of the power-down detection sub-circuit 12, a locking instruction to the control terminal of the first switch 124 to control the first switch 124 to be turned on. Specifically, the first switch 124 being turned on indicate that the first terminal of the first switch 124 and the second terminal of the first switch 124 are connected. In other words, trigger edge of the power-down signal is its falling edge. The controller 13 inputs the locking instruction to the control terminal of the first switch 124.

That is, the controller 13 issues a locking instruction to the control terminal of the first switch 124 upon receiving the power-down signal output by the power-down detection sub-circuit 12, to control the first switch 124 to be turned on. Specifically, the first switch 124 being turned on indicates that the first terminal of the first switch 124 and the second terminal of the first switch 124 are connected. The first switch 124 is turned on, and the output signal of the power-down detection sub-circuit 12 is pulled down to the reference voltage. In a state where the first switch 124 is kept to be turned on, the power-down detection sub-circuit 12 always outputs a low level signal. That is, the output signal of the power-down detection sub-circuit 12 is locked.

Since power-down of the low-voltage side power source 11 may be caused by vibration of the device powered by an electrical power resource or poor contact of the low-voltage side power source 11 or other reasons, the low-voltage side power source 11 may repeatedly appear to be turned on or off. Each time the low-voltage side power supply 11 is disconnected (i.e., powered down), the memory will be triggered to record fault information, which will cause multiple erasing of the memory. In embodiments of the present disclosure, the output signal of the power-down detection sub-circuit 12 is locked to the low level signal, so as to avoid frequently triggering the memory to record fault information, thereby avoiding multiple erasing of the memory, and thus prolonging the life of the memory.

The controller 13 is further configured to send an unlocking instruction to the control terminal of the first switch 124, to control the first switch 124 to be turn off. The first switch 124 being turned off indicates that the first terminal of the first switch 124 and the second terminal of the first switch 124 are disconnected.

After the memory records the fault information, the controller 13 may issue an unlocking instruction to the power-down detection sub-circuit 12 to control the first switch 124 to be turned off. After the first switch 124 is turned off, the output signal of the power-down detection sub-circuit 12 is unlocked, and thus the power-down detection sub-circuit 12 is initialized. A new round of detection on powder-down of the low-voltage side power supply 11 may be performed.

Figure 4:
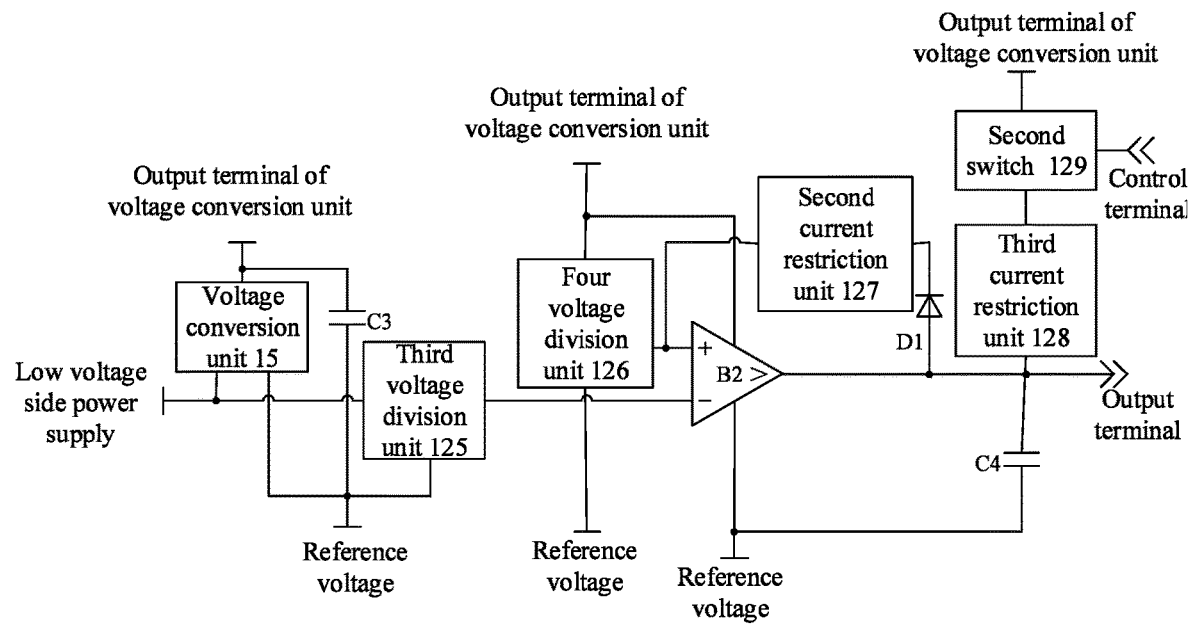
FIG. 4 is a schematic structural diagram of another specific implementation of a power-down detection sub-circuit according to embodiments of the present disclosure.

FIG. 4 is a schematic structural diagram of another specific implementation of a power-down detection sub-circuit according to an embodiment of the present disclosure. As shown in FIG. 4, the power-down detection sub-circuit 12 include a third voltage division unit 125, a fourth voltage division unit 126, a second current restriction unit 127, a third current restriction unit 128, a second comparator B2, and a diode D1, a third capacitor C3, a fourth capacitor C4, and a second switch 129.

One terminal of the third capacitor C3 is connected to the output terminal of the voltage conversion unit, and the other terminal of the third capacitor C3 is connected to a reference voltage.

The number of the third capacitors C3 is not limited herein. The third capacitor C3 is configured to supply power to the power-down detection sub-circuit 12, the controller 13, the memory and the like after the low-voltage side power source 11 is powered down, to maintain operation of the power-down detection sub-circuit 12, the controller 13, and the memory, and ensure implementation of detection of power-down of the low-voltage side power supply 11 and recording of fault information by the memory.

It should be noted that the capacitance of the third capacitor C3 may be selected according to power consumption of the power-down detection sub-circuit 12, the controller 13 and the memory, and the length of time required for the memory to record fault information. The capacitance of the third capacitor C3 needs to at least satisfy consumption of the power-down detection sub-circuit 12, the controller 13, and the memory for a time period required to record the fault information.

The voltage outputted by the voltage conversion unit 15 is a standard supply voltage obtained by converting the voltage of the low-voltage side power source 11 via the voltage conversion unit 15.

An input terminal of the third voltage division unit 125 is connected to the low-voltage side power source 11, a first output terminal of the third voltage division unit is connected to an inverting input terminal of the second comparator B2, and a second output terminal of the third voltage division unit is connected to a reference voltage.

The third voltage division unit 125 is configured to provide an input voltage to the inverting input of the second comparator B2. The third voltage division unit 125 may include a resistor or other element having a certain impedance. There is no limitation on connection manner and the number of elements in the third voltage division unit 125.

An input terminal of the fourth voltage division unit 126 is connected to the output terminal of the voltage converting unit, a first output terminal of the fourth voltage division unit 126 is connected to a non-inverting input terminal of the second comparator B2, and a second voltage division unit 126 is connected to a reference voltage.

The fourth voltage division unit 126 is configured to provide an input voltage to the non-inverting input of the second comparator B2. The fourth voltage dividing unit 126 may include a resistor or other element having a certain impedance. There is no limitation on connection manner and the number of elements in the fourth voltage division unit 126.

The non-inverting input of the second comparator B2 is connected to one terminal of the second current restriction unit 127. The output terminal of the second comparator B2 is connected to anode of the diode D1, one terminal of the fourth capacitor C4, one terminal of the third current restriction unit 128, and the output terminal of the power-down detection sub-circuit 12. The first power supply terminal of the second comparator B2 is connected to the output of the voltage conversion unit. The second power supply terminal of the second comparator B2 is connected to the other terminal of the fourth capacitor C4 and a reference voltage.

The second current restriction unit 127 and the third current restriction unit 128 may include resistors or other elements having a certain impedance, and there is no limitation on connection manner and the number of elements in the second current restriction unit 127 and the third current restriction unit 128.

The fourth capacitor C4 is configured to filter an output signal from the output terminal of the second comparator B2.

The cathode of the diode D1 is connected to the other end of the second current restriction unit 127.

The first terminal of the second switch 129 is connected to the output terminal of the voltage conversion unit, and the second terminal of the second switch 129 is connected to the other terminal of the third current limiting unit 128. The control terminal of the second switch 129 is coupled to the output terminal of the controller 13.

The second switch 129 may include one or more of a switch, a triode, a Metal-Oxide-Semiconductor Field-Effect Transistor (MOSFET), and the like, which is not limited herein.

The operation of the power-down detection sub-circuit 12 shown in FIG. 4 in the power-down detection circuit will be described below. For convenience of explanation, an example will be described. FIG. 5 is a schematic structural diagram of a power-down detection sub-circuit in another specific example of the embodiment of the present disclosure. As shown in FIG. 5, it is assumed that the third voltage dividing unit 125 includes two resistors, a fifth resistor R5 and a sixth resistor R6. One terminal of the fifth resistor R5 is connected to the low-voltage side power source 11, the other terminal of the fifth resistor R5 is connected to one terminal of the sixth resistor R6, and the other terminal of the sixth resistor R6 is connected to a reference voltage. The other terminal of the fifth resistor R5 and one terminal of the sixth resistor R6 are both connected to an inverting input terminal of the second comparator B2. The fourth voltage division unit 126 includes two resistors, a seventh resistor R7 and an eighth resistor, respectively. One terminal of the seventh resistor R7 is connected to the second voltage V2, the other terminal of the seventh resistor R7 is connected to one terminal of the eighth resistor R8, and the other terminal of the eighth resistor R8 is connected to a reference voltage. The other terminal of the seventh resistor R7 and one terminal of the eighth resistor R8 are both connected to a non-inverting input terminal of the second comparator B2. The second current restriction unit 127 includes a resistor, a ninth resistor R9. One terminal of the ninth resistor R9 is connected to the non-inverting input terminal of the second comparator B2, and the other terminal of the ninth resistor R9 is connected to cathode of the diode D1. The third current restriction unit 128 includes a resistor, a tenth resistor R10. One terminal of the tenth resistor R10 is connected to the second switch 129. The other terminal of the tenth resistor R10 is connected to the output terminal of the second comparator B2 and one terminal of the fourth capacitor C4. Let resistances of the fifth resistor R5, the sixth resistor R6, the seventh resistor R7, the eighth resistor R8, the ninth resistor R9, and the tenth resistor R10 are $R_5$, $R_6$, $R_7$, $R_8$, $R_9$, and $R_{10}$, respectively, and $R_6/R_5=R_8/R_7$. The output voltage of the low-voltage side power source 11 is $V_{battery}$. The standard supply voltage is $V_{DD}$.

Then, the input voltage Vp of the non-inverting input terminal of the second comparator B2 is as shown in the formula (3), and the input voltage Vn of the inverting input terminal of the second comparator B2 is as shown in the formula (4):

$$Vp = V_{DD} \times R8/(R7+R8) \quad (3)$$

$$Vn = V_{battery} \times R6/(R5+R6) \quad (4)$$

The second switch 129 has an initialization state being ON. It should be noted that the initialization state herein refers to an initial state in which detection is started. When the detection is started, the second switch 129 is turned on.

When the low-voltage side power source 11 does not have a power-down event, the output voltage $V_{battery}$ of the low-voltage side power source 11 is higher than the standard supply voltage $V_{DD}$, so $V_p<V_n$. The output signal from the output terminal of the second comparator B2 is a low level signal.

When the low-voltage side power supply 11 has a power-down event, the output voltage $V_{battery}$ of the low-voltage side power supply 11 is lower than the standard supply voltage $V_{DD}$. Therefore, $V_p>V_n$. The output signal from the output terminal of the second comparator B2 is a high level signal. The output terminal of the second comparator B2 is connected to the output terminal of the power-down detection sub-circuit 12, so the power-down detection sub-circuit 12 also outputs a high-level signal, which may be used as a power-down signal.

When the controller 13 detects the power-down signal output from the power-down detection sub-circuit 12, it can control the memory to record fault information.

Since the output terminal of the second comparator B2 outputs a high level signal, the diode D1 will be forwarded. The ninth resistor and the tenth resistor connected in series are connected in parallel with the seventh resistor connected to the non-inverting input terminal of the second comparator B2, and thus a voltage division ratio of the seventh resistor is pulled high, so that the input voltage of the non-inverting input terminal of the second comparator B2 is raised.

It should be noted that, when designing the power-down detection circuit, appropriate resistance values of the ninth resistor and the tenth resistor should be selected, so that in the case where the ninth resistor and the tenth resistor connected in series are connected in parallel to the seven resistor connected to the non-inverting input terminal of the second comparator B2, the boosted input voltage of the non-inverting input terminal of the second comparator B2 is higher than a maximum value of the input voltage of the inverting input terminal of the second comparator B2. In the present embodiments, since voltage drops of the diode D1 and the second switch 129 are all small, they are ignored here.

The boosted input voltage $V_{p\_lock}$ of the non-inverting input terminal of the second comparator B2 is as shown in the formula (5):

$$V_{p\_lock}=V_{DD}\times R_8/\{[(R_9+R_{10})\times R_7/(R_9+R_{10}+R_7)]+R_8\} \quad (5)$$

In a state where the second switch 129 is kept to be on, the input voltage of the non-inverting input terminal of the second comparator B2 always maintains at an increased voltage, so the power-down detection sub-circuit 12 always outputs a high level signal. That is, the output signal of the power-down detection sub-circuit 12 is locked.

Since power-down of the low-voltage side power source 11 may be caused by vibration of the device powered by an electrical power resource or poor contact of the low-voltage side power source 11 or other reasons, the low-voltage side power source 11 may repeatedly appear to be turned on or off. Each time the low-voltage side power supply 11 is disconnected (i.e., powered down), the memory will be triggered to record fault information, which will cause multiple erasing of the memory. In embodiments of the present disclosure, the output signal of the power-down detection sub-circuit 12 is locked to the high level signal, so as to avoid frequently triggering the memory to record fault information, thereby avoiding multiple erasing of the memory, and thus prolonging the life of the memory.

The input terminal of the controller 13 is connected to the output terminal of the power-down detection sub-circuit 12, and the output terminal of the controller 13 is connected to the control terminal of the second switching unit 129. The controller 13 is further configured to send, after the memory records the fault information, a second unlocking instruction to the control terminal of the second switch 129 to control the second switch 129 to be turned off. The second switch 129 being turned off indicates that the first terminal of the second switch 129 is disconnected from the second terminal of the second switch 129.

After the memory records the fault information, the controller 13 may send a second unlocking instruction to the control terminal of the second switch 129 to control the second switch 129 to be turned off. The second switch 129 being turned off indicates that the first terminal of the second switch 129 is disconnected from the second terminal of the second switch 129. After the second switch 129 is turned off, the output signal of the power-down detection sub-circuit 12 is unlocked, and thus the diode D1 is turned off, causing initialization of the power-down detection sub-circuit 12.

It should be noted that, if it requires to perform a new round of detection on power-down of the low-voltage side power supply 11, the second switch 129 needs to be in an initialization state, that is, ON state, such that the power-down detection sub-circuit 12 can perform a new round of detection of power-down of the low-voltage side power supply 11.

There is further provided a control method for a power-down detection circuit according to embodiments of the present disclosure. The control method can be applied to a power-down detection circuit as discussed in the above embodiments. FIG. 6 is a flowchart of a control method applied in a power-down detection circuit according to an embodiment of the present disclosure. As shown in FIG. 6, the control method include steps S301 to S303.

In step S301, a power-down detection sub-circuit acquires an output voltage of the low-voltage side power supply, and determines whether a power-down event occurs in the low-voltage side power supply according to the output voltage of the low-voltage side power supply.

If the output voltage of the low-voltage side power supply drops and falls below a certain threshold, it can be determined that the low-voltage side power supply has a power-down event. It should be noted that the threshold for determining a power-down event of the low-voltage side power source may be preset according to a specific structure of the power-down detection circuit and circuit requirements, and the threshold is a limit value for determining whether the low-voltage side power source has a power-down event.

In step S302, the power-down detection sub-circuit sends a power-down signal to the controller in the case that it is determined that a power-down event occurs in a low-voltage side power.

It should be noted that if it is determined that the low-voltage side power supply does not have a power-down event, the power-down detection sub-circuit may also send an non-power-down signal to the controller. The non-power-down signal is different from the power-down signal. For example, the power-down signal may be a low-level signal, and the non-power-down signal may be a high-level signal. Alternatively, the power down signal may be a high level signal and the non-power-down signal may be a low level signal.

In step S303, the controller receives the power down signal, and controls the memory to record fault information.

The fault information includes current information of a high voltage bus sensed by a high-voltage side current sensor. The fault information may also include other information as discussed in corresponding description in the foregoing embodiments, and details are not described herein again.

Regarding descriptions of the steps S301 to S303, please refer to corresponding descriptions in the foregoing embodiments, and details are not described herein again.

In embodiments of the present disclosure, the power-down detection sub-circuit in the power-down detection circuit can determine whether the low-voltage side power source has a power-down event by detecting the output voltage of the low-voltage side power source. If it is determined that the low-voltage side power supply has a power-down event, a power-down signal is sent to the controller. The controller, upon receipt of the power down signal, controls the memory to record fault information. Therefore, it is possible to timely discover power-down of the low-voltage side power supply and record the fault information, which facilitates subsequent fault analysis and prevention, and improves safety of the device powered by an electrical power resource.

Figure 7:
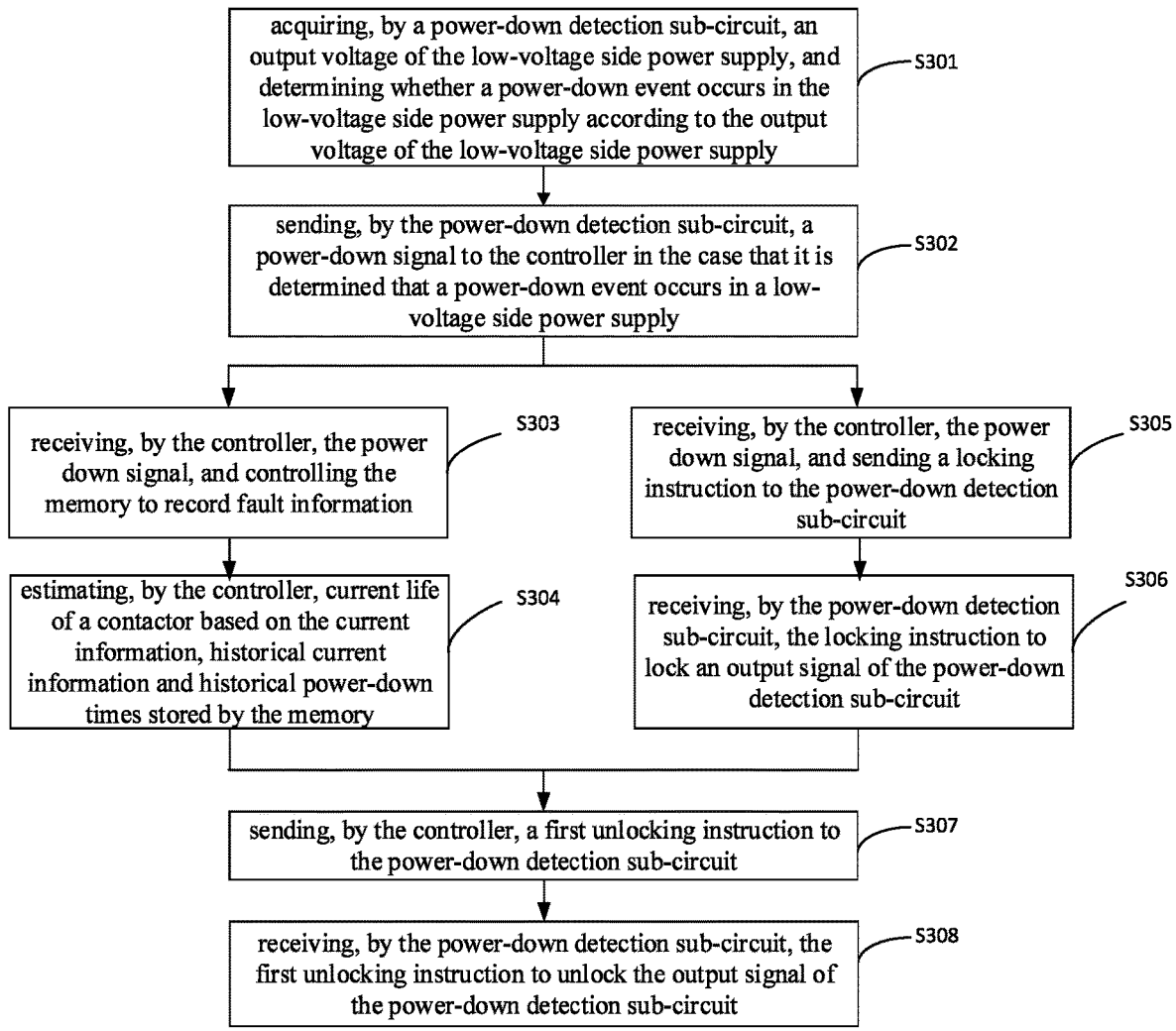
FIG. 7 is a flowchart of a control method applied in a power-down detection circuit according to another embodiment of the present disclosure.

FIG. 7 is a flowchart of a control method of a power-down detection circuit according to another embodiment of the present disclosure. The control method of the power-down detection circuit can be applied to a power-down detection circuit obtained in conjunction with FIGS. 1 and 2. FIG. 7 is different from FIG. 6 in that the control method of the power-down detection circuit shown in FIG. 7 may further include steps S304 to S308.

In step S304, the controller estimates current life of a contactor based on the current information, historical current information and historical power-down times stored by the memory.

In step S305, the controller, upon receipt of the power-down signal, sends a locking instruction to the power-down detection sub-circuit.

In step S306, the power-down detection sub-circuit receives the locking instruction to lock an output signal of the power-down detection sub-circuit.

In step S307, the controller sends a first unlocking instruction to the power-down detection sub-circuit.

In some examples, in order to ensure that the fault information about power-down of the low-voltage side power supply current can be recorded completely, the step S307 to step S308 may be performed after a time period since the memory finishes recording the fault information in step S303.

In step S308, the power-down detection sub-circuit receives the first unlocking instruction to unlock the output signal of the power-down detection sub-circuit.

It should be noted that execution sequence of step S305 and step S303 is not limited. These two steps may be performed sequentially or simultaneously, and are not limited herein.

For the related descriptions of the steps S304 to S308, refer to the corresponding descriptions in the foregoing embodiments, and details are not described herein again.

Figure 8:
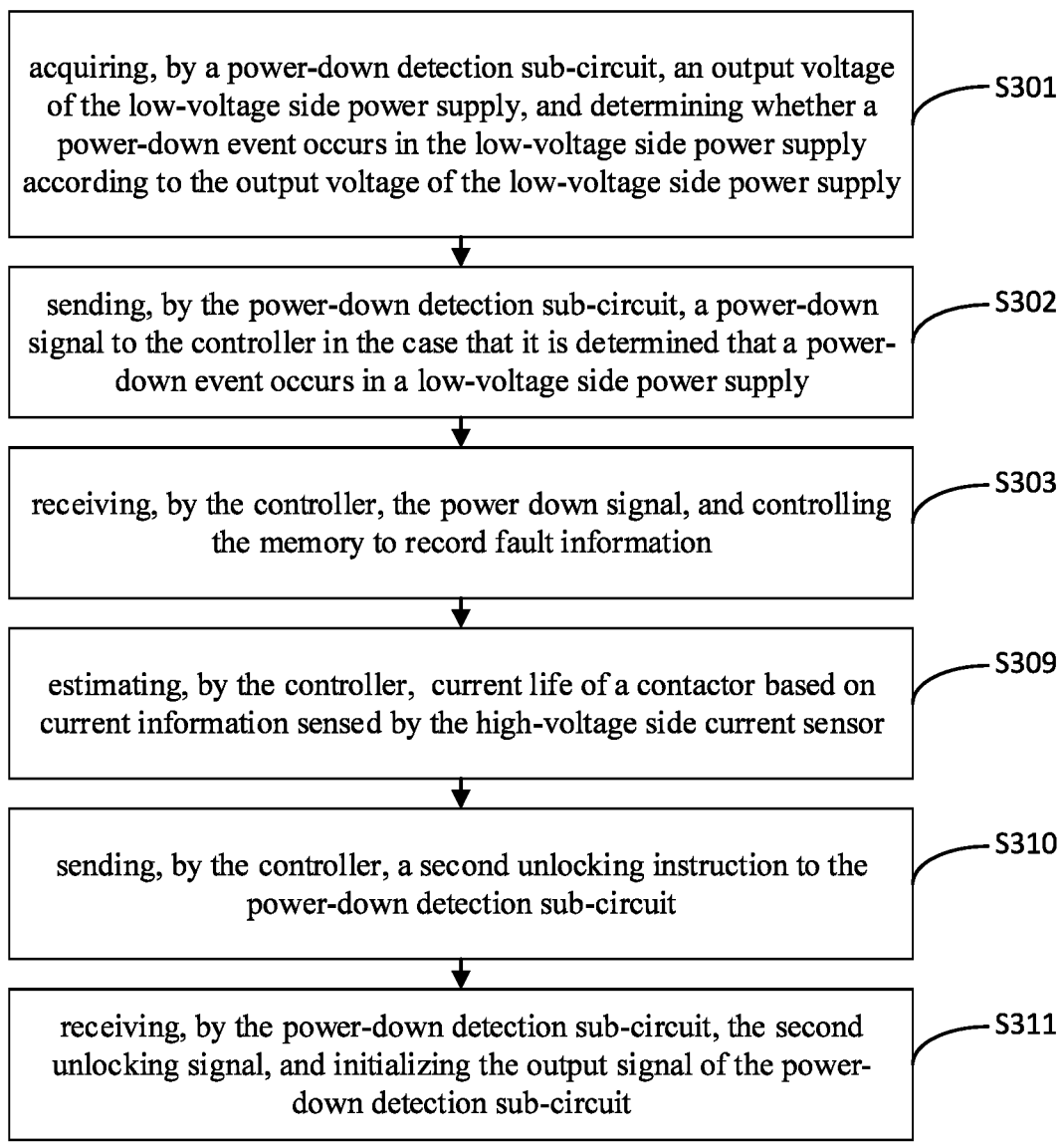
FIG. 8 is a flowchart of a control method applied in a power-down detection circuit according to still another embodiment of the present disclosure.

FIG. 8 is a flowchart of a control method of a power-down detection circuit according to still another embodiment of the present disclosure. The control method of the power-down detection circuit can be applied to a power-down detection circuit obtained in conjunction with FIGS. 1 and 4. FIG. 8 is different from FIG. 6 in that the control method of the power-down detection circuit shown in FIG. 8 may further include steps S309 to S311.

In step S309, the controller estimates current life of a contactor based on the current information sensed by the high-voltage side current sensor.

In step S310, the controller sends a second unlocking instruction to the power-down detection sub-circuit.

In some examples, in order to ensure that the fault information about power-down of the low-voltage side power supply can be recorded completely, the step S310 to step S311 may be performed after a time period since the memory finishes recording of the fault information in step S303.

In step S311, the power-down detection sub-circuit receives the second unlocking signal, and initializes the output signal of the power-down detection sub-circuit.

For the related descriptions of the steps S309 to S311, refer to the corresponding descriptions in the foregoing embodiments, and details are not described herein again.

It should be understood that the various embodiments in the specification are described in a progressive manner, and the same or similar parts between the various embodiments may be referred to each other, and each embodiment focuses on the difference from other embodiments. The method embodiment is described in a relatively simple manner. For related information, please refer to the description of the system embodiment. The present invention is not limited to the specific steps and structures described above and illustrated in the drawings. A person skilled in the art can make various changes, modifications and additions or change the order between the steps under spirit of the invention. Also, a detailed description of known methods and techniques is omitted herein for the sake of brevity.

The functional units in the above embodiments may be implemented as hardware, software, firmware, or the combination thereof. When implemented in hardware, it can be, for example, an electronic circuit, an application specific integrated circuit (ASIC), a suitable firmware, plug-ins, function card, and the like. When implemented in software, the elements of the present invention are programs or code segments that are used to perform the required tasks. The program or code segments can be stored in a machine readable medium or transmitted over a transmission medium or communication link through a data signal carried in carriers. A "machine readable medium" may include any medium that can store or transfer information. Examples of machine readable media may include electronic circuits, semiconductor memory devices, ROMs, flash memories, erasable ROMs (EROMs), floppy disks, CD-ROMs, optical disks, hard disks, fiber optic media, radio frequency (RF) links, and the like. The code segments can be downloaded via a computer network such as the Internet, an intranet, and the like.

What is claimed is:

1. A method for controlling a power-down detection circuit of a vehicle, comprising:
receiving, by a controller of the power-down detection circuit, a power-down signal, wherein the power-down signal is sent from a power-down detection sub-circuit of the power-down detection circuit when it is determined by the power-down detection sub-circuit that an output voltage of a low-voltage side power supply of the power-down detection circuit is smaller than a threshold, and wherein the power-down detection sub-circuit and the controller are powered by the low-voltage side power supply;

controlling, by the controller, a memory of the power-down detection circuit to record fault information, wherein the fault information comprises current information of a high voltage bus sensed by a high-voltage side current sensor of the power-down detection circuit, wherein the high-voltage side current sensor is located in a high-voltage side circuit of the vehicle having the high voltage bus, and wherein the high-voltage side circuit comprises the high-voltage side current sensor, a high-voltage side battery pack and a contact or, wherein the contactor comprises a positive contactor connected to a positive electrode of the high-voltage side battery pack and a negative contactor connected to a negative electrode of the high voltage side battery pack; and performing, by the controller, a fault diagnosis based on the fault information.

2. The method according to claim 1, further comprising:
estimating, by the controller, current life of the contactor based on the current information, historical current information and historical power-down times stored by the memory.

3. The method according to claim 1, further comprising:
sending, by the controller and upon receipt of the power-down signal, a locking instruction to the power-down detection sub-circuit to instruct the power-down detection sub-circuit to lock an output signal of the power-down detection sub-circuit.

4. The method according to claim 3, wherein after the fault information is recorded, the method further comprises:
sending, by the controller, a first unlocking instruction to the power-down detection sub-circuit to instruct the power-down detection sub-circuit to unlock the output signal.

5. The method according to claim 3, wherein after the fault information is recorded, the method further comprises:
sending, by the controller, a second unlocking instruction to the power-down detection sub-circuit to instruct the power-down detection sub-circuit to initialize the output signal.

6. The method according to claim 1, wherein the low-voltage side power supply is obtained by stepping down a voltage of the high-voltage side battery pack through a power supply circuit.

7. A controller of a power-down detection circuit in a vehicle, comprising:
a memory for storing instructions; and
a processor configured to execute the instructions to:
receive a power-down signal, wherein the power-down signal is sent from a power-down detection sub-circuit of the power-down detection circuit when it is determined by the power-down detection sub-circuit that an output voltage of a low-voltage side power supply of the power-down detection circuit is smaller than a threshold, and wherein the power-down detection sub-circuit and the controller are powered by the low-voltage side power supply;

control a memory of the power-down detection circuit to record fault information, wherein the fault information comprises current information of a high voltage bus sensed by a high-voltage side current sensor of the power-down detection circuit, wherein the high-voltage side current sensor is located in a high-voltage side circuit of the vehicle having the high voltage bus, and wherein the high-voltage side circuit comprises the high-voltage side current sensor, a high-voltage side battery pack and a contactor, wherein the contactor comprises a positive contactor connected to a positive electrode of the high-voltage side battery pack and a negative contactor connected to a negative electrode of the high voltage side battery pack; and perform a fault diagnosis based on the fault information.

8. The controller according to claim 7, wherein the processor is further configured to execute the instructions to:
estimate current life of the contactor based on the current information, historical current information and historical power-down times stored by the memory.

9. The controller according to claim 7, wherein the processor is further configured to execute the instructions to:
send, upon receipt of the power-down signal, a locking instruction to the power-down detection sub-circuit to instruct the power-down detection sub-circuit to lock an output signal of the power-down detection sub-circuit.

10. The controller according to claim 9, wherein the processor is further configured to execute the instructions to:
after the fault information is recorded, send a first unlocking instruction to the power-down detection sub-circuit to instruct the power-down detection sub-circuit to unlock the output signal.

11. The controller according to claim 9, wherein the processor is further configured to execute the instructions to:
after the fault information is recorded, send a second unlocking instruction to the power-down detection sub-circuit to instruct the power-down detection sub-circuit to initialize the output signal.

12. The controller according to claim 7, wherein the low-voltage side power supply is obtained by stepping down a voltage of the high-voltage side battery pack through a power supply circuit.

13. A computer-readable storage medium having computer programs stored thereon, the computer programs being executed by a computer to cause the computer to perform the method according to claim 1.

* * * * *